United States Patent
Diester et al.

(10) Patent No.: US 9,910,668 B2
(45) Date of Patent: Mar. 6, 2018

(54) SENSOR-DRIVEN EVENTING AND TWO STAGE NOTIFICATION

(71) Applicant: International Business Machines Corporation, Armonk, NY (US)

(72) Inventors: Matthias Diester, Stuttgart (DE); Patrizia Gufler, Schoenaich (DE); Andreas Nauerz, Stuttgart (DE); Thomas Steinheber, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 14/849,645

(22) Filed: Sep. 10, 2015

(65) Prior Publication Data

US 2017/0078423 A1  Mar. 16, 2017

(51) Int. Cl.
*H04L 29/08* (2006.01)
*G06F 9/00* (2006.01)

(52) U.S. Cl.
CPC ............ *G06F 9/00* (2013.01); *H04L 67/28* (2013.01); *H04L 67/2838* (2013.01); *H04L 67/02* (2013.01); *H04L 67/12* (2013.01)

(58) Field of Classification Search
None
See application file for complete search history.

(56) References Cited

U.S. PATENT DOCUMENTS

| 8,760,298 B2 | 6/2014 | Cavanaugh |
| 8,856,240 B2 | 10/2014 | Trossen et al. |
| 9,577,868 B2 * | 2/2017 | Amano ............... G06Q 10/06 |
| 2006/0106840 A1 * | 5/2006 | Rooney ................ H04L 67/26 |
| 2010/0214090 A1 * | 8/2010 | Sartini ................ H04L 12/581 340/517 |

(Continued)

FOREIGN PATENT DOCUMENTS

| CN | 103458033 A | * 12/2013 |
| WO | 2013131190 A1 | 9/2013 |
| WO | 2013150466 A2 | 10/2013 |

OTHER PUBLICATIONS

Li et al., "R-Event: A RESTful Web Service Framework for Building Event-DrivenWeb", Service Computation 2010 : The Second International Conferences on Advanced Service Computing, pp. 7-13.

(Continued)

*Primary Examiner* — Natisha Cox
(74) *Attorney, Agent, or Firm* — Michael O'Keefe

(57) ABSTRACT

A computer-implemented method for reducing network traffic in an event-driven infrastructure by a two-stage notification subscription mechanism may be provided. The method includes subscribing, by client components to notifications for topics at a client-side hub, opening, a connection to a server-side notification server initiated by the client-side hub and subscribing, by the client-side hub to the server-side notification server for a united set of topics client components subscribed to at the client-side hub. The method also comprises, based on the subscriptions, a communicating, a united set of data relating to the united set of topics from the server-side notification server to the client-side hub, wherein the united set of data comprises data the client components subscribed to at the client-side hub such that the network traffic is reduced.

20 Claims, 11 Drawing Sheets

(56) References Cited

U.S. PATENT DOCUMENTS

| | | | |
|---|---|---|---|
| 2011/0041140 A1* | 2/2011 | Harm | G06F 9/4843 |
| | | | 719/318 |
| 2012/0101912 A1* | 4/2012 | Sen | G06Q 30/08 |
| | | | 705/26.3 |
| 2012/0233107 A1* | 9/2012 | Roesch | G06N 5/02 |
| | | | 706/47 |
| 2012/0303774 A1* | 11/2012 | Wilson | H04L 67/26 |
| | | | 709/223 |
| 2014/0032707 A1 | 1/2014 | Doshi | |
| 2014/0129661 A1* | 5/2014 | Thyagaraja | G06F 9/542 |
| | | | 709/207 |
| 2014/0330896 A1 | 11/2014 | Addala et al. | |

OTHER PUBLICATIONS

Oracle, "Oracle Portal 10g Release 2 Technical Overview", An Oracle White Paper, Aug. 2005, Oracle Fusion Middleware, pp. 1-33.

\* cited by examiner

SENSOR-DRIVEN EVENTING AND TWO STAGE NOTIFICATION

BACKGROUND

The invention relates generally to a computer-implemented method for reducing network traffic in an event-driven infrastructure, and more specifically, to a reduction of network traffic in an event-driven infrastructure by a two-stage notification subscription mechanism. The invention relates further to a system for reducing network traffic in an event-driven infrastructure by a two-stage notification subscription mechanism, networked computer systems, and a computer program product.

Smart devices are interconnected through the internet, and through the Internet of Things, in the modern sensorized world producing huge amount of data. This automatic data generation leads to an explosion of information and data transport over networks. Thus, a challenge of today's information systems is dealing with this huge amount of data in an intelligent and effective way, in particular to transmitting these huge amount of data.

As an example, in medical areas patients are monitored with different devices, and each device is continuously producing data for patient health monitoring systems. Crowded hospitals and manpower shortage of doctors and nurses may result in insufficient care with patients. In order to support personnel in the healthcare sector, an information system presenting the most important current information, while personalizing the information system to the users knowledge and preferences, is needed. A comparable information management requirement does exist for other industries, such as traffic information systems, stock price information systems and factory floor information systems.

Portals can serve as a part of such an information system. A portal is a web-based application that allows generation of user-based content from different sources. Portals may consist of various pages which include several different portlets managed by a portal container that processes requests and generates dynamic content. Portals, along with event mechanisms, have been introduced with the Java Specification Requests (JSR) 286 Portlet Specification 2.0 with respect to reacting to events or situations that occur outside the portal system. However, portals have some limitations concerning responsiveness based on real-time changes.

SUMMARY

According to an embodiment of the present invention, a computer-implemented method for reducing network traffic in an event-driven infrastructure by a two-stage notification subscription mechanism may be provided. The method may include subscribing by client components to notifications for topics at a client-side hub, opening a connection to a server-side notification server initiated by the client-side hub and subscribing by the client-side hub to the server-side notification server for a united set of topics client components subscribed to at the client-side hub.

Furthermore, the method may include communicating a united set of data relating to the united set of topics from the server-side notification server to the client-side hub, where the united set of data includes data the client components subscribed to at the client-side hub such that the network traffic is reduced.

There is also a related system and computer program product for reducing network traffic in an event-driven infrastructure by a two-stage notification subscription mechanism provided.

Embodiments of the inventive subject-matter may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
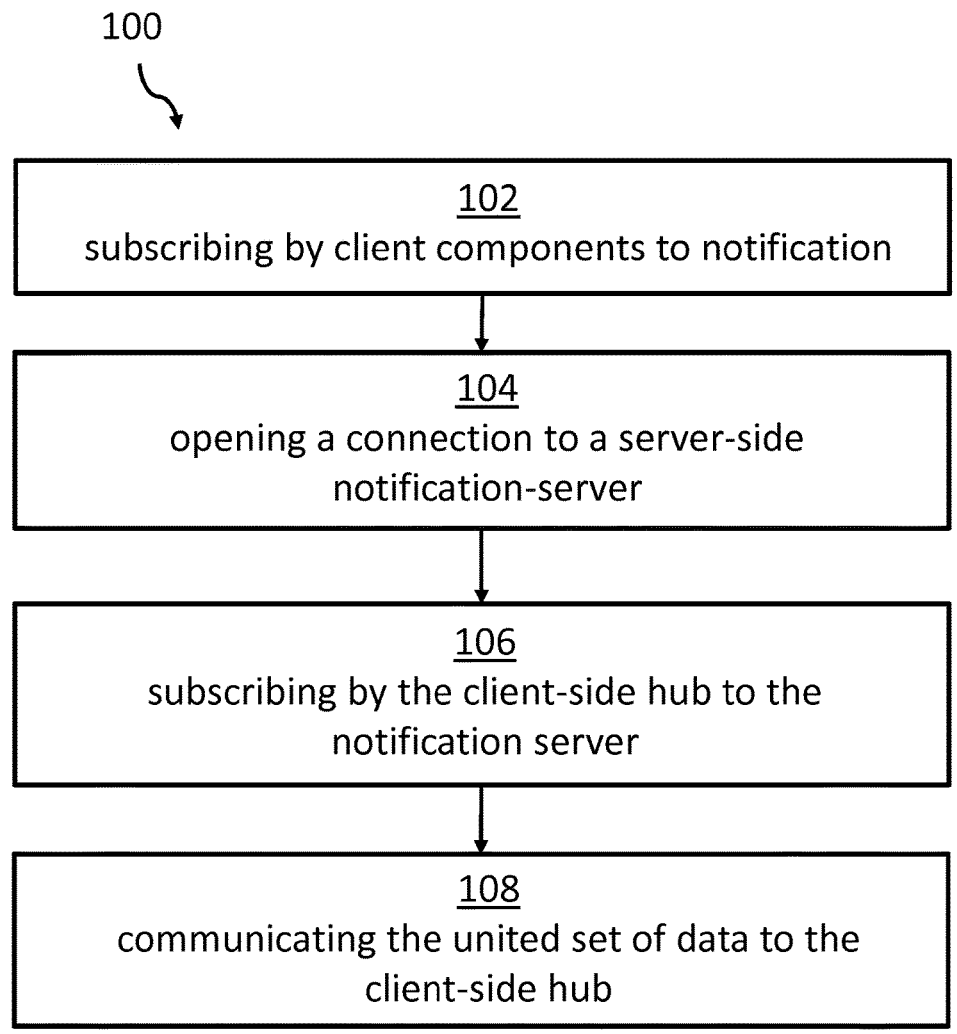
Figure 2:
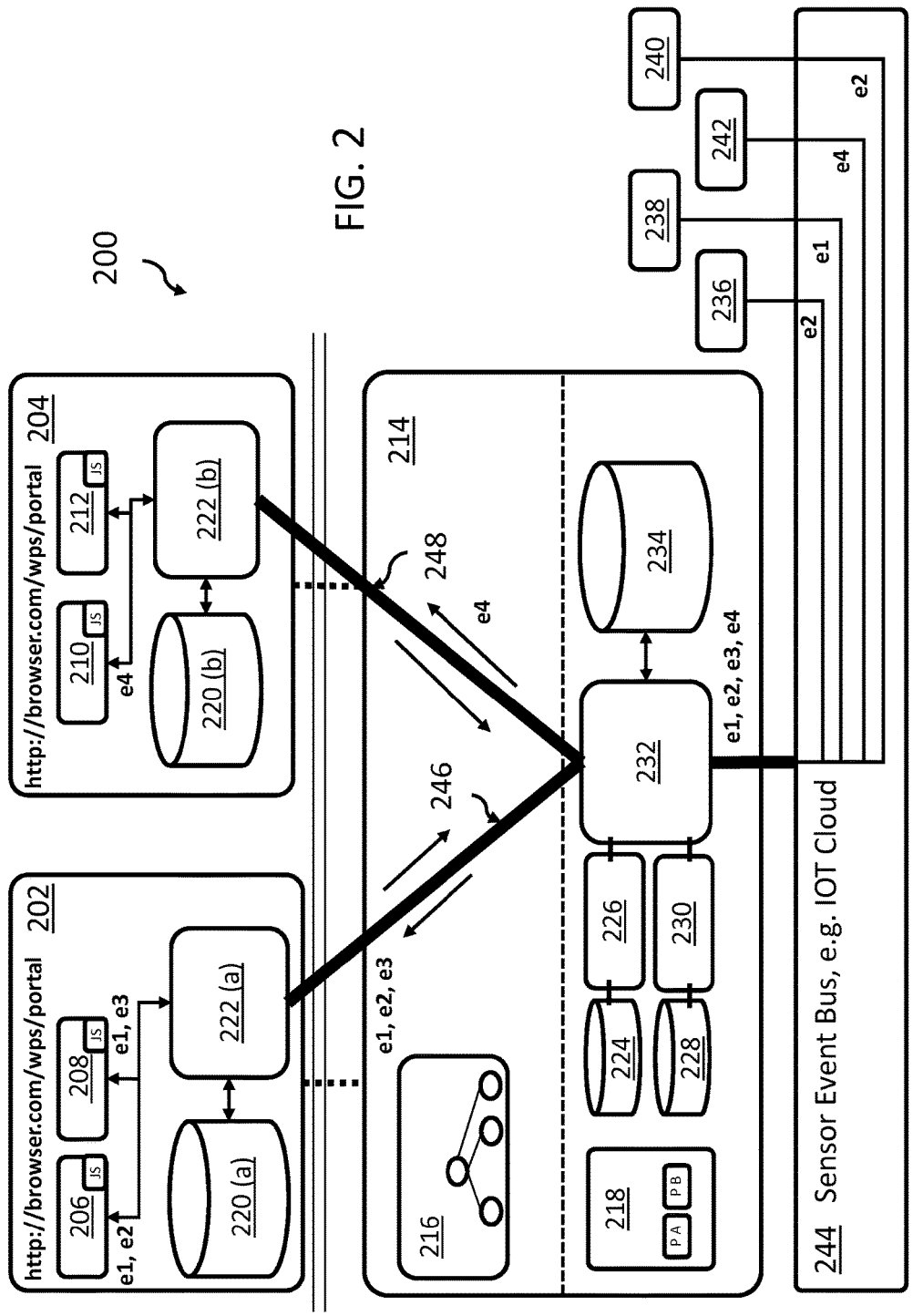
Figure 3:
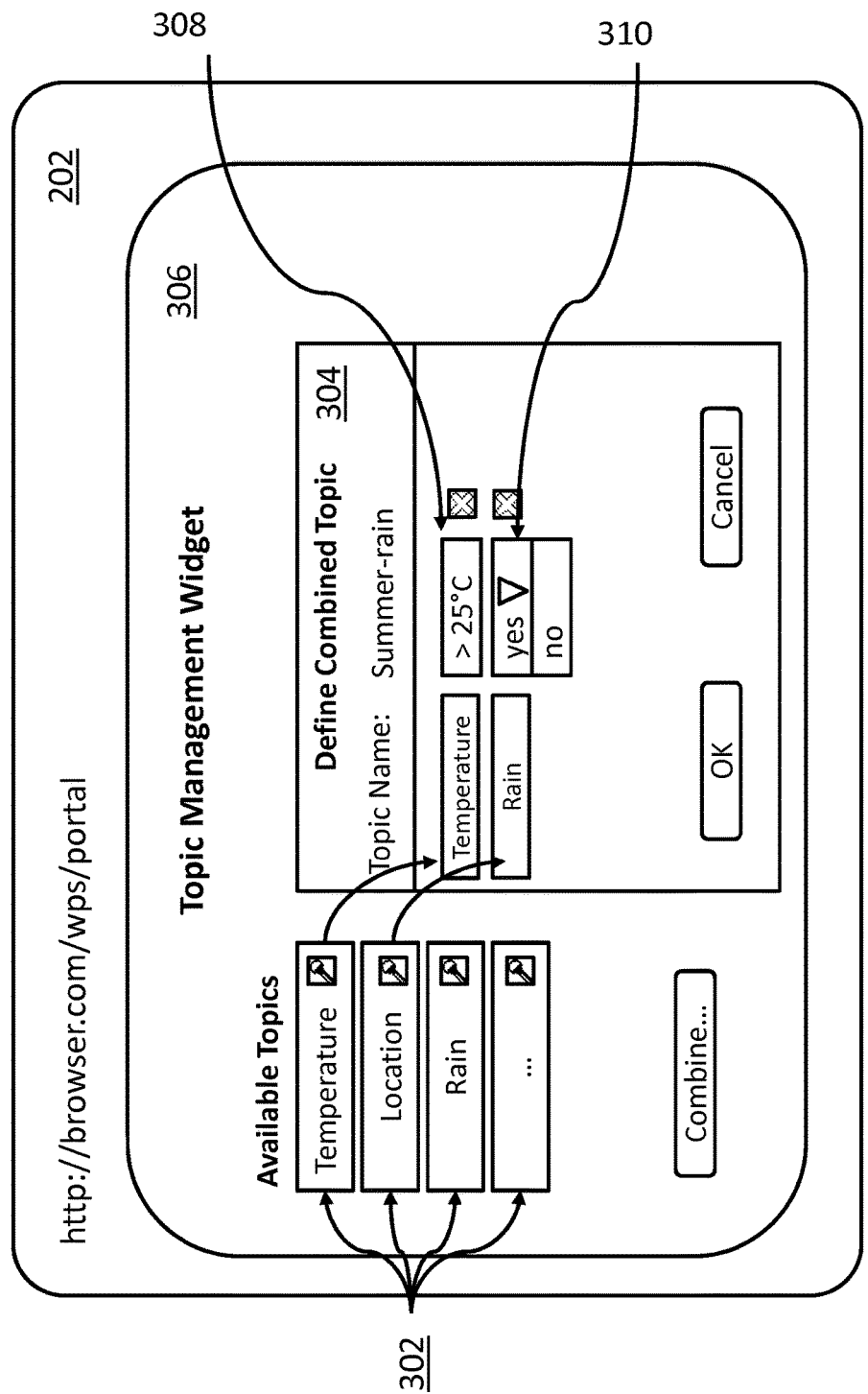
Figure 4:
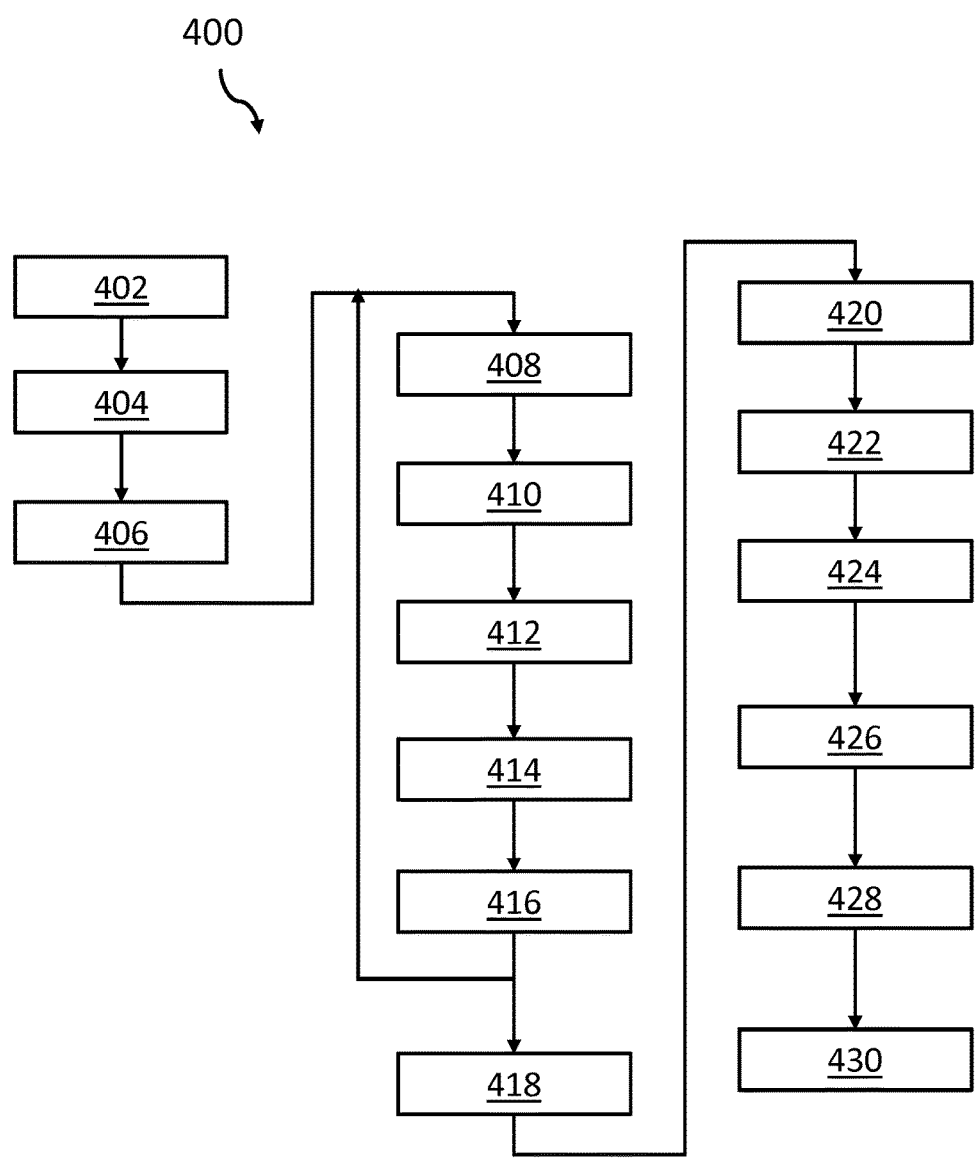
Figure 5:
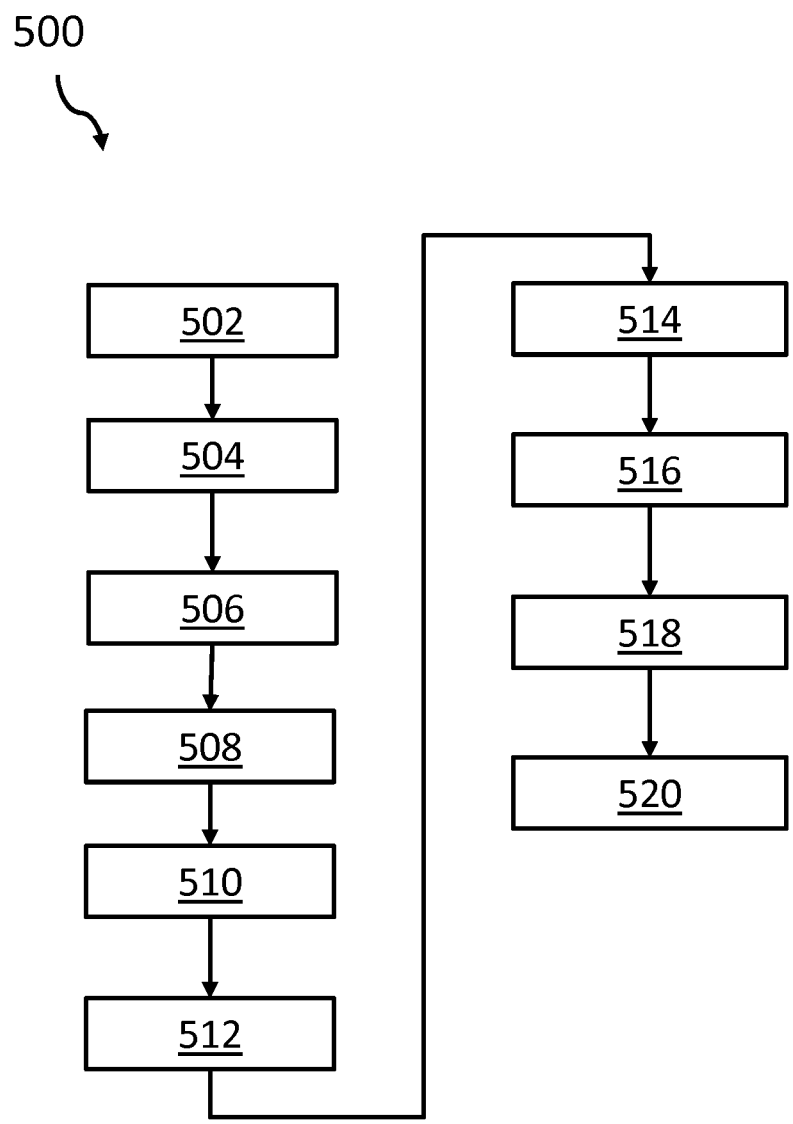
Figure 6:
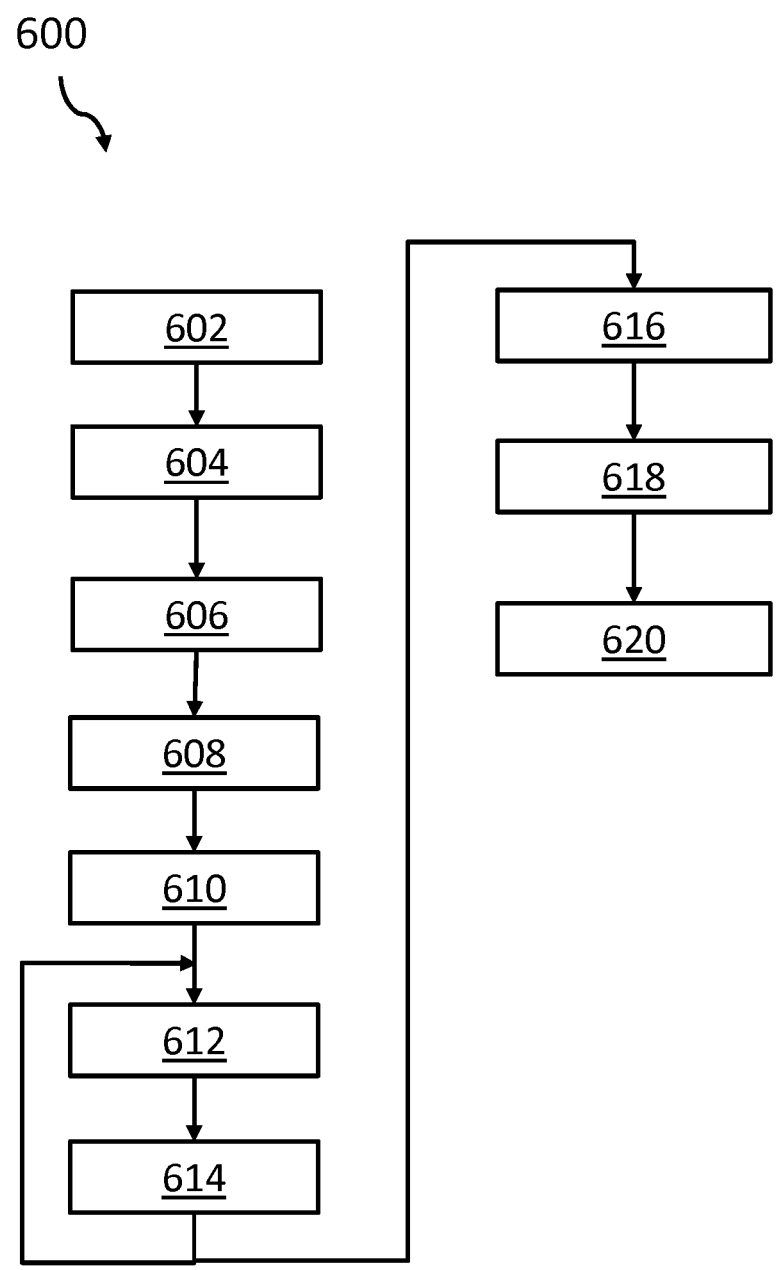
Figure 7:
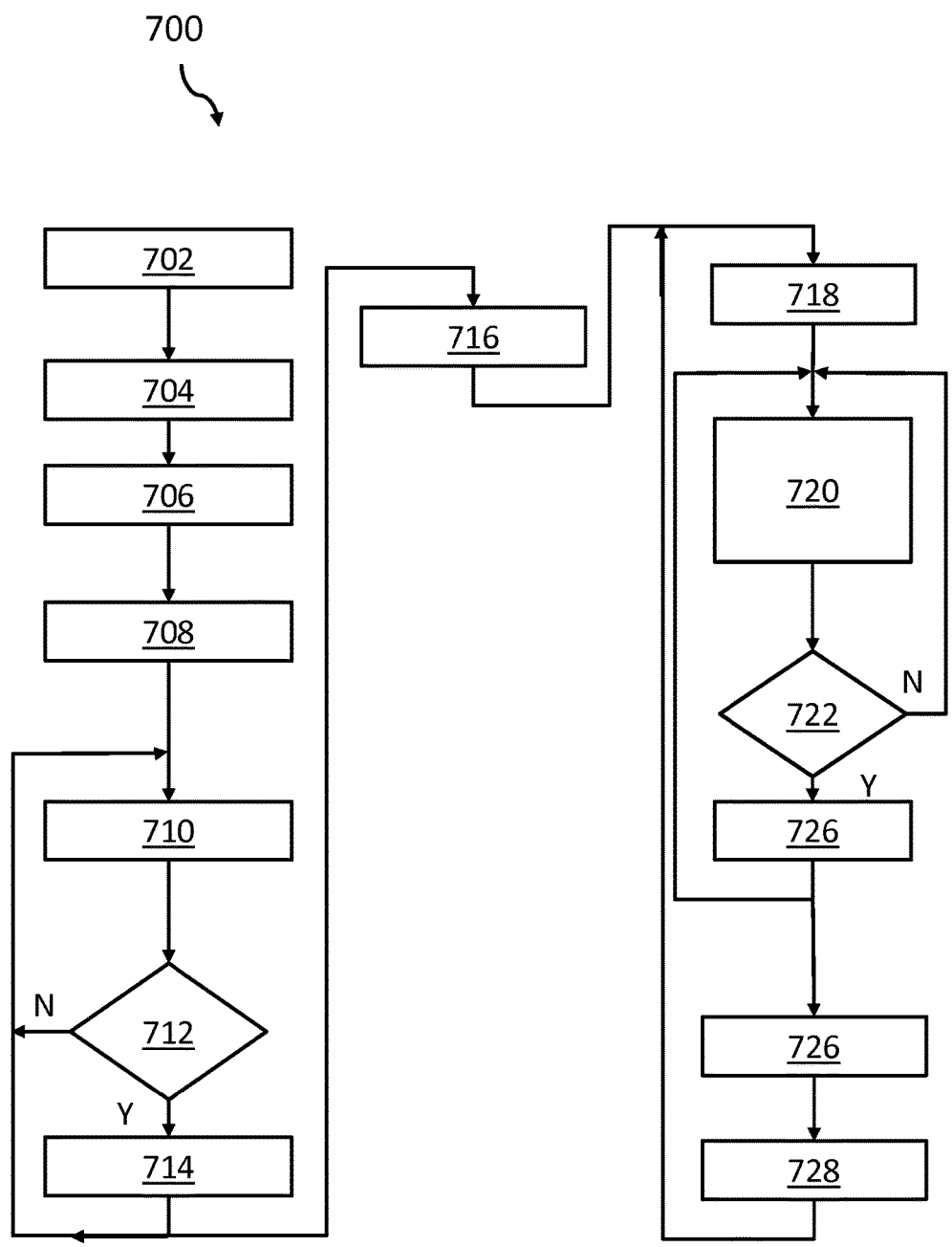
Figure 8:
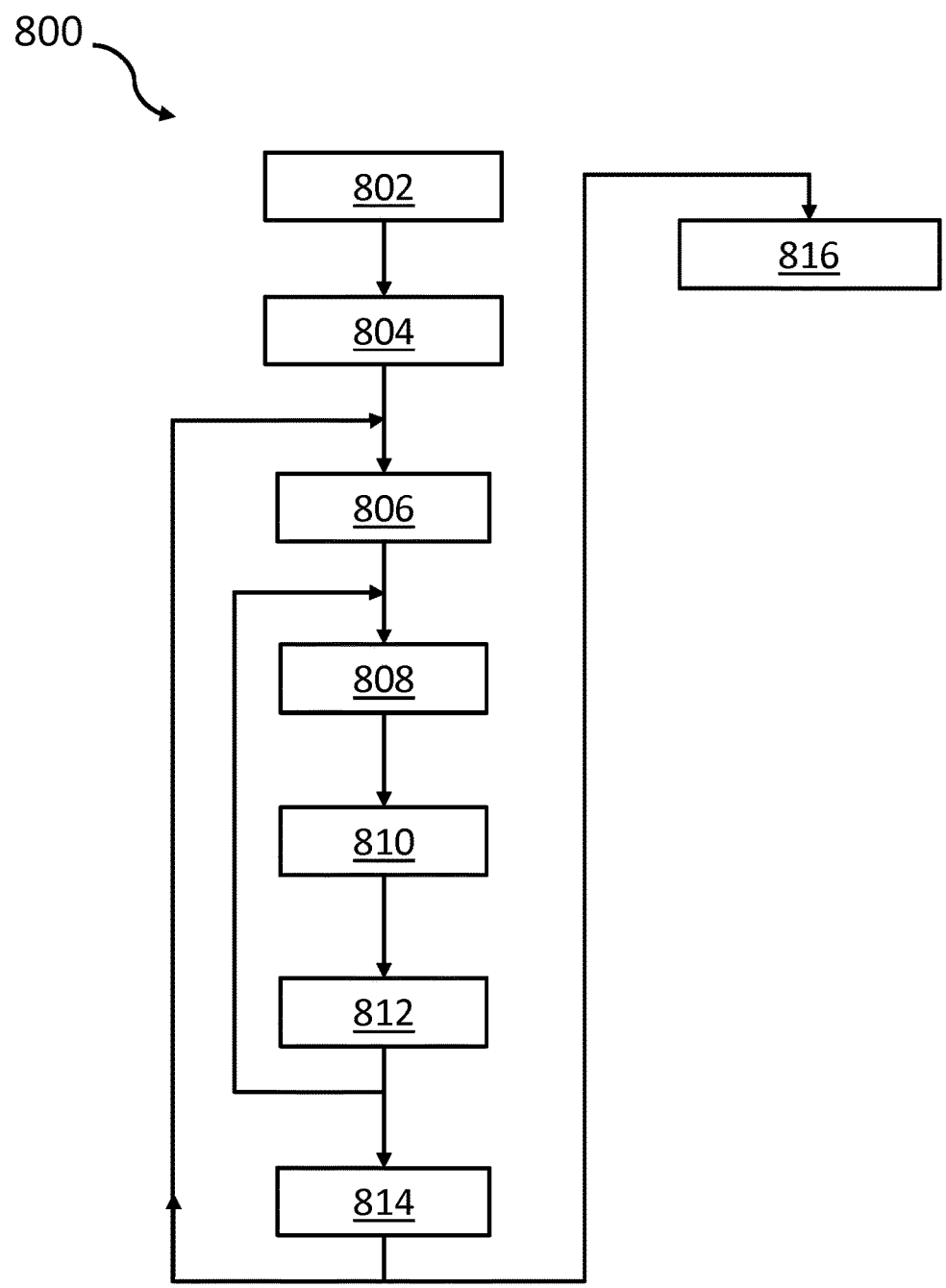
Figure 9:
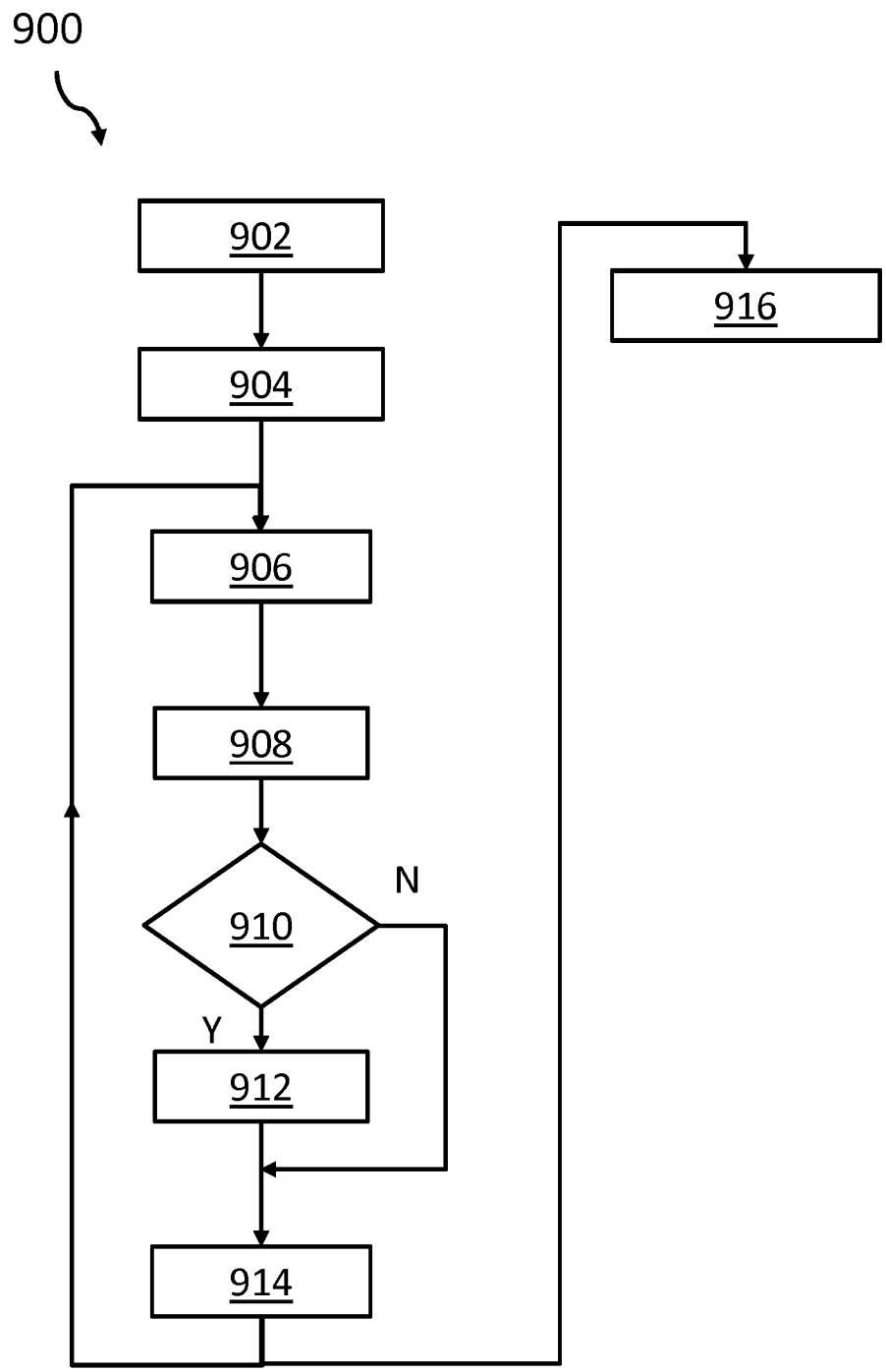
Figure 10:
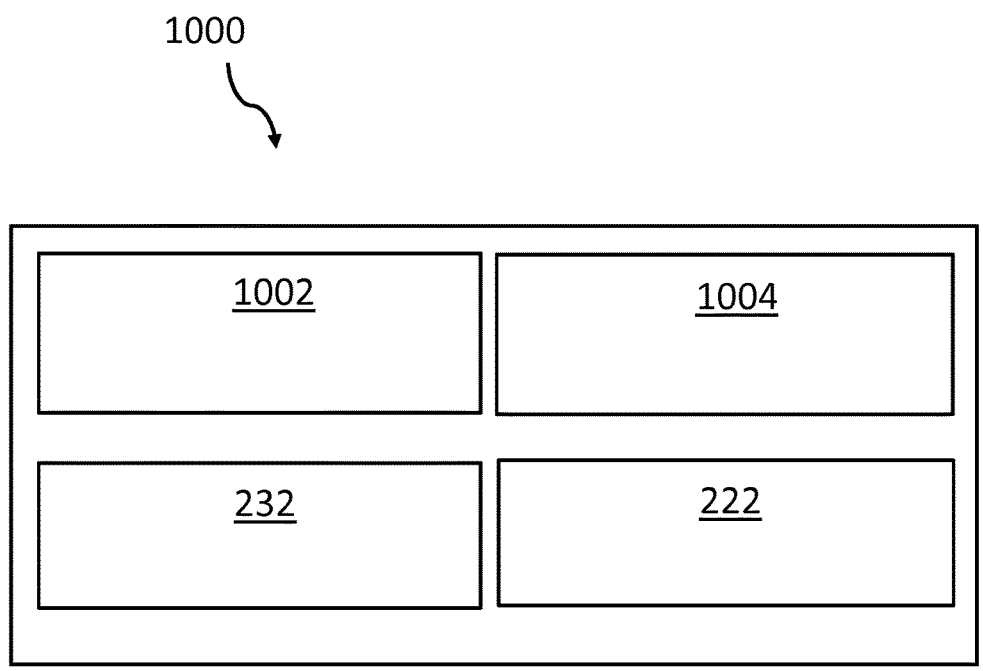
Figure 11:
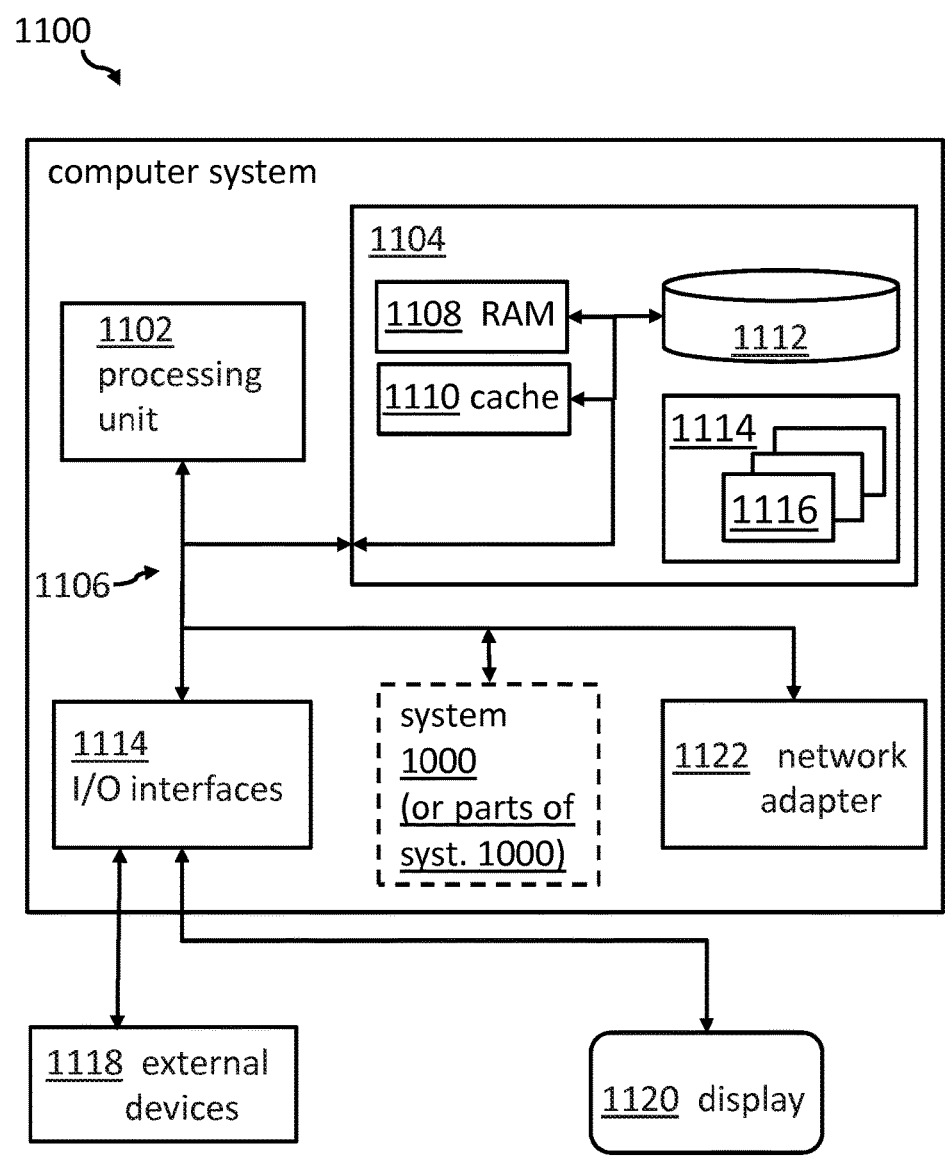

Embodiments of the invention will be described, by way of example only, and with reference to the following drawings:

FIG. 1 shows an overview block diagram of an embodiment of the inventive computer-implemented method for reducing network traffic in an event-driven infrastructure by a two-stage notification subscription mechanism;

FIG. 2 shows a block diagram of an architecture in which the inventive subject-matter may be integrated;

FIG. 3 shows a block diagram of an embodiment of a screen layout for combined topics;

FIG. 4 shows a flow chart for an initialization and portlet registration;

FIG. 5 shows a flow chart for an administration of access control;

FIG. 6 shows a flow chart for an editing of topic aggregations;

FIG. 7 shows a flow chart for a dispatching of topics to the client-side-hub;

FIG. 8 shows a flow chart for a dispatching of topics to components by the client-side hub;

FIG. 9 shows a changing of a portlet visibility based on notifications;

FIG. 10 shows an overview block diagram of the inventive system for reducing network traffic in an event-driven infrastructure by the two-stage notification subscription mechanism; and FIG. 11 shows an embodiment of a computing system instrumental for executing the inventive method.

DETAILED DESCRIPTION

In the context of this description, the following conventions, terms and/or expressions may be used:

A term "event-driven infrastructure" may denote a system of interconnected components in a computer network based on an event-driven architecture. That may be a software architecture pattern promoting the production, detection, consumption of, and reaction to events. An event may be defined as "a significant change in state". For example, when a consumer purchases a car, the car's state changes from "for sale" to "sold". A car dealer's system architecture may treat a state change as an event whose occurrence can be made known to other applications within the architecture. From a formal perspective, an event notification is produced, published, propagated, detected or consumed. The event notification is a message, which is typically asynchronous, and is not an event itself. The event is a state change that triggers a message. The event does not travel, the event occurs.

This architectural pattern may be applied by the design and implementation of an application and a system which transmit the event among coupled software components and services. An event-driven system typically consists of an event emitter (or agent), an event consumer (or sink), and an event channel. The event emitter has the responsibility to detect, gather, and emit the event notification. The event emitter does not know a consumer of the event, it does not even know if a consumer exists, and in case it does exist, the event emitter does not know how the event is used or further processed. The sink has the responsibility of applying a reaction as soon as the event is presented. The reaction may or may not be provided by the sink itself. For instance, the sink might filter, transform and forward the event notification and related data to a component or it may provide a self-contained reaction to the event. The event notification may be triggered from a sensor connected to a network, by a message oriented middleware driving workflow, or it may be triggered by a data sensor with a proprietary connection to a server.

A term "two-stage notification subscription mechanism" may denote that the event notification may use a notification server that manages the event notification and the data sensor asynchronously for a client component, e.g., a portlet.

The term "client component" may denote a portlet in a browser or portal window. The client component may be a part of a hardware or a software system, such as a related application programming interface.

The term "topic" may denote a measurement value related to a data sensor. There may be a direct relationship between the measurement value from a data sensor and the topic. An example for a topic may be "temperature" and the data sensor may have units of ° C. There may be a "combined topic". The combined topic may be defined as a joint topic relating to two or more topics. If, e.g., the combined topic "summer rain" may include a topics "temperature" T and a topic "rain". The topic "rain" may be delivered as a digital value with either "yes" or "no". In this example, the combined topic will trigger the event notification if two conditions for a summer rain may be fulfilled, e.g., T>25° C. and rain="yes". If only one of these conditions are met there may be no event notification about the combined topic "summer rain".

The term 'client-side hub' may denote a component of a portal being executed on a client-side or on a client computer being adapted for an aggregating of topic event notifications from client components. Such client components may be data fields to be displayed in a portlet. A program and a script running on the client computer may be treated as the client components having a need for information about topics. A corresponding application programming interface may be required.

The term "server-side notification server" may denote one or more components of a portal server of a computer server to which the client computer may be connected via a computer network. The server-side notification server may be enabled to collect a synchronously arriving event data or measurement data from sensors, and aggregate them for communicating them to the client-side hub.

The term "sensors" may denote any device adapted for generating data, e.g., measurement data and sending them via any connection to a notification server. The connection may be a wired connection or a wireless connections and may be based on a standard communication network or any proprietary connection.

The term 'access right' may denote a consequence of a security setting in a computer system allowing an access to specific data by a user or a system. If the user or system does not have an access right to specific data, the data access may be denied.

The proposed computer-implemented method for reducing network traffic in an event-driven infrastructure by a two-stage notification subscription mechanism may offer advantages and technical effects as follows:

The event notification is sent to the client computer rather than the notification server querying for updates. This results in a reduction of network traffic. The inventive method and system is overcoming limitations concerning responsiveness of portals based on real-time changes. Currently, there exists no possibility to parse an external notification to the portlet presenting it on the corresponding portlet to the user. This problem arises already in basic business applications such as a task list in a portlet that should be updated when a new trigger arrives. To handle events happening outside the portal context, there exists no single point of contact interaction with which the events from external sources can be integrated easily into the portal. Moreover, up to now no mechanisms exist that allow pushing data to the client-side portal. With the current solution there is no need any longer that data have to be pulled by the portlets. It is no longer required that each portlet needing external information has to manage the retrieval and the needed data on its own. Overhead for real-time-based portal functions can be reduced.

The subscription mechanism described reduces the network traffic even further due to the fact that the given client—in this case, the client-side hub—will only receive those events from a notification server that the portlets on the portal page are subscribed to.

The also described topic event aggregation prevents from sending unnecessary event notifications to the client as only the aggregated or combined topic will be sent if changes are present. The client will not receive unnecessary event notifications.

In the following, a detailed description of the figures will be given. All instructions in the figures are schematic. First, a block diagram of an embodiment of the inventive computer-implemented method for reducing network traffic in an event-driven infrastructure by a two-stage notification subscription mechanism is given. Afterwards, further embodiments as well as embodiments of the system for reducing network traffic in an event-driven infrastructure by a two-stage notification subscription mechanism will be described.

FIG. 1 shows a block diagram of an embodiment of the computer-implemented method, (hereinafter "method" 100 for reducing network traffic in an event-driven infrastructure by a two-stage notification subscription mechanism. The method may comprise subscribing, 102, by the client components—in particular a plurality of portlets or any other fragment or application with a corresponding application programming interface (API)—to notifications for topics at a client-side hub. This may be done directly instead of a subscription at a server-side. The method 100 may further comprise opening, 104, a connection to a server-side notification server initiated by the client-side hub and subscribing, 106, by the client-side hub to the server-side notification server for a united set of topics the client components subscribed to at the client-side hub. It may be noted that the united set of topics is not equal to the combined topic.

Furthermore, the method may include communicating, 108, a united set of data related to the united set of topics from the server-side notification server to the client-side hub, wherein the united set of data includes data the client components subscribed to at the client-side hub, such that the network traffic is reduced if compared to a direct 1:1 subscription of all client components to the server side notification server or an alternative permanent pull for information by a client component.

According to a preferred embodiment of the method 100, the set of data may comprise event notifications from sensors which may typically use their own proprietary protocol to communicate with the notification server. Also workflow events or events and measurement data from a messaging infrastructure, a database, a hardware system, a power supply, an air condition system or the like may be treated as a sensor. Thus, the server-side notification server may aggregate the united set of data received by the sensors. A notification server may also perform a preprocessing of the data received by the sensors. This may, e.g., include a consultation of sensor measurement data, average building, a check against thresholds, and the like.

As mentioned before, and according to an additional embodiment of the method 100, the client components may be portlets. However, also other hardware or software components equipped with a related API may act as the client components.

According to an embodiment of the method 100, the client-side hub may separate the united set of data received from the notification server and may dispatch individual data values out of the united set of data to subscribed notification requests the client components have subscribed to. Once the united set data has traveled over a connection between a server and a client computer in a combined or compressed manner, the client-side hub disassembles now the united data set and assigns it to the sources the notification requests originates from.

According to an additional embodiment of the method 100, the united set of data comprises only those data related to threshold topics. In this context, a threshold topic may be defined as a topic the client components subscribed to at the client-side hub and which measurement data may be compared against a threshold value; it may be checked whether a topic value may be greater or smaller than a predefined threshold. Additionally, also relative measures are possible.

In an embodiment of the method, the united set of data may comprise only a logical value for threshold topics indicative of an exceeding or undercutting of the threshold value. This may reduce the network traffic between a client-side portal and a portal server even more. Sometimes a client component may not need an actual measurement value of a sensor. The client component may only be interested in the fact that a certain predefined threshold may have been exceeded or undercut. In this case, the notification server may only communicate information about this exceeding or undercutting event to the client-side hub for a dispatch to a client component.

In another optional embodiment of the method, at least two topics and/or threshold topics may be defined as a combined topic. In such a case, the united set of data to be transmitted from the notification server to the client-side hub may only comprise those data related to a combined topic the client components subscribed to at the client-side hub. The aggregation and logical link between individual topics may already be performed by the notification server which may also help to reduce network traffic as already explained in the above example about the "summer rain".

In accordance with an embodiment of the method, the subscribing by the client components to notifications for topics at a client-side hub is subject to an access right of a user using the client component or subject to an access right of the client component itself. This way, only those client components may have access to sensor data that have an authorization for.

FIG. 2 shows a block diagram of an architecture of a framework 200 in which the inventive subject-matter may be integrated. The framework 200 shows conventional elements of a portal framework, and may include a portal or browser window 202 and a browser window 204, portlets 206, 208, 210 and 212. Each of the portlets 206, 208, 210 and 212 are equipped with JavaScript (JS) capabilities on the client-side. The framework 200 further includes a portal server engine 214, a page aggregator 216 and a portlet container 218. The portlet container 218 may contain data about individual portlets.

Elements in the framework 200 required for an execution of the inventive method may include: a client subscription registry 220, a client-side hub 222 (with sub-reference-numerals (a) and (b)) a notification access control (NAC) store 224, a notification access control unit 226, a topic aggregation (TA) store 228, a topic aggregation server 230, a notification server 232 and a notification service registry 234. The just mentioned elements are connected via physical or logical data flows shown as arrows between the elements. For example, sensors 236, 238, 240, 242 may all be connected via, e.g., proprietary protocols via a sensor event bus 244—which may actually be implemented as an Internet of Things Cloud infrastructure—to the notification server 232 of the portal server engine 214. The portal server engine 214 or parts of it may be executed on a server computer, whereas the client-side systems may all be implemented and executed on one or more client computers. The client-side hub 222 may be JavaScript-based.

A line or socket connection 246 and a line or socket connection 248 may be implemented as persistent, durable connections via a WebSocket for the lifetime of the browser windows 202, 204. The portlets 206, 208, 210 and 212 register themselves with a respective client hub as soon as they are loaded using a callback function that in return can be called by the client-side hub 222 (*a*) or (*b*), respectively, to notify portlets about new topic arrivals. The client-side hub 222 aggregates the topics of the portlets 206, 208, 210 and 212 on a given page. A union set of registered topics will be communicated back to the notification server 232 which allows reducing bandwidth as mentioned above.

FIG. 3 shows a block diagram of an embodiment of a screen layout for combined topics. A topic management widget 306 in the browser window 202 shows a topic 302, such as "temperature", "location", "rain", and the like. A key symbol in the top management widget may indicate whether the topic 302 may be accessible to a user or whether an access control mechanism may prevent the user from accessing the topic 302. If the user wants to define a combined topic, a "define combined topic" pop-up widget (hereinafter "widget") 304 may appear. The topics 302 to be combined may be positioned within the widget 304 by a conventional drag-and-drop (indicated as arrows in FIG. 3) mechanism from the list of available topics 302. The combined topic may be given a name, for example "summer rain". Conditions or thresholds may be set for each of the topics 302. As shown, the threshold for the temperature 308 is set for >25° C. and a digital value "yes" 310 is set for the topic "rain". If both conditions apply, the client component may be informed about the event "summer rain". In additional UI (user interface) buttons such as "combine", "OK" or "Cancel" may support the functionality of this widget.

FIG. 4 shows a flow chart 400 for an initialization of the client-side hub 222 and a registration of the portlets 206 and 208 with a client-side hub 222 when the portlet 206 is initially loaded in the browser window 202. At 402, a user may navigate to the browser window 202 that has the client-side hub 222 assigned. Next at 404, the client-side hub 222 may initialize the beginning of a page load. In step 406, the browser window 202 may load the portlets 206, 208 which are assigned to the browser window 202. Then at 408, the portlet 206 registers itself with the client-side hub 222. The portlet 206 communicates a callback function that may be triggered when the topic 302 arrives at 410. In step 412, the portlet 206 communicates the topic 302 to be notified about, which are stored in a portlet preference. Then 414, the portlets 206 and 208 communicate the topic 302 to be visible or invisible based on the portlet preference. In a step 416, the client-side hub 222 registers the portlets 206, 208, the callback function and the topics 302 which the portlet 206 subscribes to in the client subscription registry 220. There may be a loopback to step 408 for registering topics 302 for each portlet 206 and 208.

In a further step 418, the browser window 202 may finish loading. In step 420, the client-side hub 222 computes the united set of topics the portlets 206, 208 are interested in.

Then 422, the client-side hub 222 registers itself with the united set of topic subscriptions at the notification server 232. In step 424, the notification server 232 stores the client-side hub registration along with the united set of topics 302 in the notification server registry 234. The backend notification server 232 registers then, 426, for receiving additional topics 302 at the sensor event bus 244. In step 428, the client-side hub 222 establishes a socket connection 248 from the client-side hub to the notification server 232 which is connected as the given portal page is open in the browser window 202. Finally 430, the client-side hub 222 is ready for receiving notifications and notification server 232 is ready for publishing notifications to the client-side hub 222.

FIG. 5 shows a flow chart 500 for an administration of an access control. For an excuse control 502, an administrator navigates to a topic management UI control (not shown). The topic management UI control loads then, 504, the topics 302 which are available from the notification server 232. Next 506, the administrator clicks the UI control to launch the topic notification access control widget (not shown) for a topic 302 (e.g., temperature). Then 508, the topic management UI control loads the topic access control widget. In a step 510, the topic access control widget loads available user groups from the portal backend for selection by the administrator. In step 512, the topic access control widget loads current access control settings from the notification access control.

In a further step 514, the administrator selects or deselects the user groups that will be granted access to notifications for the topic 302. Then 516, the administrator clicks on "OK" to persist the access control settings. Furthermore, in step 518 the topic notification access control widget sends the selection to a notification access control backend. And finally 520, the notification access control backend stores the selection performed by the administrator in the notification access control (NAC) store 224.

FIG. 6 shows a flow chart 600 for an editing of topic aggregations/definition of a combined topic. The flowchart 600 for FIG. 6 may be read in combination with FIG. 3. The following steps—which may also be read in the context of FIG. 3—may be performed in a sequence of:

Step 602: The administrator navigates to a topic management UI control.

Step 604: The topic management UI control loads the available topics from the notification server 232.

Step 606: The administrator clicks on a "Combine Topic" UI control to launch the topic aggregation widget.

Step 608: The topic management UI control launches the topic aggregation widget.

Step 610: The administrator or user enters a name for the new aggregated/combined topic to be created.

Step 612: The administrator or user adds the topics 302 (e.g., temperature) to the topic aggregation widget via drag-and-drop.

Step 614: The administrator or user adds an (optional) condition that should be met by the topic value (e.g. >25° C.; see above).

Step 616: The administrator or user clicks "OK" to persist the definition of the aggregated topic.

Step 618: The topic notification access control sends the selection to the topic aggregation server 230.

Step 620: The topic aggregation server 230 stores the selection performed by the administrator in the topic aggregation (TA) store 228.

FIG. 7 shows a flow chart 700 for a dispatching of the topic 302 to the client-side hub 222. For this purpose the following steps may be performed:

Step 702: The sensors 236, 238, 240, 242 provide topic notifications and make them available to the sensor event bus 244 (e.g., e1, e2, e4).

Step 704: The notification server 232 receives the topics 302 e1, e2, e4.

Step 706: The notification server 232 sends the topic 302 and a topic value to the topic aggregation service 230.

Step 708: The topic aggregation server 230 performs a lookup in the topic aggregation store 228 for aggregated/combined topic that are made up of a subset of the topics 302 which are provided.

Step 710: For each aggregation of the topic 302, the topic aggregation server 230 checks if the topic value meets conditions specified in the topic aggregation.

Step 712: In this step, it is checked whether all conditions are met. In case of "no" the flow of action goes back to step 710. In case of "yes" the process flow continues to the next step.

Step 714: The topic aggregation server 230 returns the aggregated or combined topic to the notification server 232. If not all aggregated/combined topics have been dealt with then process flow returns to step 710 for the next aggregated/combined topic; otherwise the process flow continues with the next step.

Step 716: The notification server 332 loads the access control information for each topic 302 from the notification access control unit 226.

Step 718: For each client-side hub 222, the notification server 232 extracts the user details of the user who loaded the browser window 202.

Step 720: For each topic 302 the client-side hub 222 registered for, the notification server 232 checks if user has access to the specified topic 302.

Step 722: In this step, it is checked whether a user has access to a specified topic 302. In case of "no", the process flow returns back to step 720. In case of "yes", the process flow continues with the next step.

Step 724: The notification server 232 adds the topic 302 to the list of topics to be sent to the client-side hub 222. If not all topics have been dealt with the process flow goes to step 720; in the other case, the process flow continues with the step 726.

Step 726: The notification server 232 sends the list of topics which the user has access to, to the respective client-side hub 222.

Step 728: The client-side hub 222 receives the list of notifications for a dispatching on the client-side.

The last step marks the beginning of a dispatching of topics from the client-side hub 222 to portlets 206. Once the topics 302 are dispatched from the server-side to the client-side hub 222, the latter is responsible for dispatching the topic notification to those UI artifacts, i.e., portlet 206 that subscribed to the topic 302 in question. For this, FIG. 8 shows a flow chart 800 a dispatching of topics to the client components 206 by the client-side hub 222. Also here, a series of steps are to be performed. These steps comprise:

Step 802: The client-side hub 222 receives the topic notifications from the notification server 232 for topic e2, e3 via a WebSocket.

Step 804: The client-side hub 222 performs a lookup in the client subscription registry 220 and loads the subscriptions for those portlets 206 that subscribed to topics e2 and e3.

Step 806: For each portlet subscription the client-side hub 222 loads the topic subscription details.

Step 808: For each topic 302, the portlet 206, 208 subscribed to at the client-side hub 222 gets the registered callback function.

Step 810: The client-side hub 222 calls the callback function of the portlet 206 for the topic 302 at hand.

Step 812: The portlet 206 executes the callback function, processes the topic Information and updates its view in the browser window 202.

Step 814: The client-side hub 222 continues with next portlet 208.

Step 816: The client-side hub 222 is done dispatching topics 302 on the client-side and remains idle until the next set of topic notifications will flow in from the notification server 232.

Instead of notifying a portlet 206, 208 about the arrival of a new topic 302, this trigger could also be used for hiding or displaying the portlet 206, 208 or other UI artifacts on a topic arrival. FIG. 9 shows a flowchart 900 of a portlet visibility based on the following notifications:

Step 902: The client-side hub 222 receives the topic notifications from the notification server 232, e.g., for topic 302 e2, e3 via a socket.

Step 904: The client-side hub 222 performs a lookup in the client subscription registry 220 and loads the subscriptions for those portlets 206 that subscribed to topics 302 e2 and e3.

Step 906: For each portlet, the client-side hub 222 loads topic subscription details.

Step 908: The client-side hub 222 checks if the subscription defines changing visibility of the portlet 206 for a topic 302 at hand.

Step 910: In this step it is determined if a change of a visibility of a topic 302 may be required. In case of "yes" the process flow continues with a step 912. In case of "no", the process flow continues with step 914.

Step 912: The client-side hub 222 changes the visibility of the portlet 206 via a markup modification.

Step 914: The client-side hub 222 continues with the next portlet 208 if a next portal is present at step 906; otherwise the process flow continues with a step 916.

Step 916: The client-side hub 222 is done changing visibility based on notifications.

FIG. 10 shows an overview block diagram of the inventive system 1000 for reducing network traffic in an event-driven infrastructure by the two-stage notification subscription mechanism again in a more generalized form for easier comprehension. The inventive system 1000 comprises a subscription unit 1002 adapted for subscribing by the client components 206, 208 (or portlets) to notifications for topics 302 at a client-side hub 222, a connection module 1004 adapted for opening a connection to a server-side notification server or server 232, wherein the connection module 1004 is triggered by the client-side hub 222. The client-side hub 222 is adapted for subscribing to the server-side notification server 232 for service for a united set of topics 302 the client components 206, 208 subscribed to at the client-side hub 222. The notification server or server 232 is adapted for communicating a united set of data relating to the united set of topics 302 from the server-side notification server 232 or service to the client-side hub 222. Thereby, the united set of data comprises data the client components 206, 208 subscribed to at the client-side hub 222 such that the network traffic is reduced if compared to a permanent pull situation.

Embodiments of the invention may be implemented together with virtually any type of computer, regardless of the platform being suitable for storing and/or executing program code. FIG. 11, shows—as an example—a computer system/server 1100.

The computer system/server 1100 is an example of a suitable computer system and is not intended to suggest any limitation as to the scope of use or functionality of embodiments of the invention described herein. Regardless, the computer system/server 1100 is capable of being implemented and/or performing any of the functionality set forth hereinabove. In the computer system/server 1100, there are components, which are operational with numerous other general purpose or special purpose computing system environments or configurations. Examples of well-known computing systems, environments, and/or configurations that may be suitable for use with the computer system/server 1100 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. The computer system/server 1100 may be described in the general context of computer system-executable instructions, such as program modules, being executed by the computer system/server 1100. Generally, program modules may include routines, programs, objects, components, logic, data structures, and so on that perform particular tasks or implement particular abstract data types. The computing system 1100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1100 is shown in the form of a general-purpose computing device. The components of computer system/server 1100 may include, but are not limited to, one or more processors or processing units 1102, a system memory 1104, and a bus 1106 that couples various system components including system memory 1104 to the processor 1102. The bus 1106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system/server 1100 typically includes a variety of computer system readable media. Such media may be any available media that is accessible by computer system/server 1100, and it includes both, volatile and non-volatile media, removable and non-removable media.

The system memory 1104 may include computer system readable media in the form of volatile memory, such as random access memory (RAM) 1108 and/or cache memory 1110. The computer system/server 1100 may further include other removable/non-removable, volatile/non-volatile computer system storage media. By way of example only, storage system 1112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to the bus 1106 by one or more data media interfaces. As will be further depicted and described below, the system memory 1104 may include at least one program product having a set (e.g., at least one) of program modules that are configured to carry out the functions of embodiments of the invention.

A program/utility 1114, having a set (at least one) of program modules 1116, may be stored in the system memory 1104 by way of example, and not limitation, as well as an operating system, one or more application programs, other program modules, and program data. Each of the operating system, one or more application programs, other program modules, and program data or some combination thereof, may include an implementation of a networking environment. Program modules 1116 generally carry out the functions and/or methodologies of embodiments of the invention as described herein.

The computer system/server 1100 may also communicate with one or more external devices 1118 such as a keyboard, a pointing device, a display 1120, etc.; one or more devices that enable a user to interact with the computer system/server 1100; and/or any devices (e.g., network card, modem, etc.) that enable the computer system/server 1100 to communicate with one or more other computing devices. Such communication can occur via Input/Output (I/O) program/utility 1114. Still yet, the computer system/server 1100 may communicate with one or more networks such as a local area network (LAN), a general wide area network (WAN), and/or a public network (e.g., the Internet) via network adapter 1122. As depicted, network adapter 1122 may communicate with the other components of the computer system/server 1100 via the bus 1106. It should be understood that although not shown, other hardware and/or software components could be used in conjunction with the computer system/server 1100. Examples, include, but are not limited to: microcode, device drivers, redundant processing units, external disk drive arrays, RAID systems, tape drives and data archival storage systems, etc.

Additionally, the inventive system 1000 for reducing network traffic in an event-driven infrastructure by a two-stage notification subscription mechanism may be attached to the bus 1106.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for reducing network traffic in an event-driven infrastructure by a two-stage notification subscription mechanism, the method comprising:
    subscribing, by client components, to notifications for topics at a client-side hub;
    opening a connection to a notification server, initiated by the client-side hub;
    subscribing, by the client-side hub, to the notification server for a united set of topics the client components subscribed to at the client-side hub; and
    receiving a united set of data relating to the united set of topics from the notification server to the client-side hub, wherein the united set of data comprises data the client components subscribed to at the client-side hub such that network traffic is reduced.

2. The method according to claim 1, wherein the united set of data comprises event notifications from sensors.

3. The method according to claim 1, wherein the client components comprise portlets.

4. The method according to claim 1, further comprising:
    separating the united set of data received from the notification server and
    dispatching individual values out of the united set of data to subscribed notification requests the client components have subscribed to.

5. The method according to claim 1, wherein the united set of data comprises data related to threshold topics, which are defined as topics the client components subscribed to at the client-side hub that exceeds a threshold value.

6. The method according to claim 5, wherein the united set of data comprises a logical value for threshold topics indicative of an exceeding or undercutting of the threshold value.

7. The method according to claim 1, wherein at least two topics and/or threshold topics are defined as a combined topic, and wherein the united set of data comprises those data related to a combined topic the client components subscribed to at the client-side hub.

8. The method according to claim 1, wherein the subscribing, by the client components, to notifications for topics at the client-side hub is subject to an access right of a user using the client component or subject to an access right of the client component itself.

9. A computer system for reducing network traffic in an event-driven infrastructure by a two-stage notification subscription mechanism, the computer system comprising:
one or more computer processors, one or more computer-readable storage media, and program instructions stored on one or more of the computer-readable storage media for execution by at least one of the one or more processors, the program instructions comprising:
program instructions to subscribe, by client components, to notifications for topics at a client-side hub;
program instructions to open a connection to a notification server, initiated by the client-side hub;
program instructions to subscribe, by the client-side hub, to the notification server for a united set of topics the client components subscribed to at the client-side hub; and
program instructions to receive a united set of data relating to the united set of topics from the notification server to the client-side hub, wherein the united set of data comprises data the client components subscribed to at the client-side hub such that network traffic is reduced.

10. The computer system according to claim 9, wherein the united set of data comprises event notifications from sensors.

11. The computer system according to claim 9, wherein the client components comprise portlets.

12. The computer system according to claim 9, further comprising:
program instructions to separate the united set of data received from the notification server and
program instructions to dispatch individual values out of the united set of data to subscribed notification requests the client components have subscribed to.

13. The computer system according to claim 9, wherein the united set of data comprises data related to threshold topics, which are defined as topics the client components subscribed to at the client-side hub that exceeds a threshold value.

14. The computer system according to claim 13, wherein the united set of data comprises a logical value for threshold topics indicative of an exceeding or undercutting of the threshold value.

15. The computer system according to claim 13, wherein at least two topics and/or threshold topics are defined as a combined topic, and wherein the united set of data comprises those data related to a combined topic the client components subscribed to at the client-side hub.

16. A computer program product for reducing network traffic in an event-driven infrastructure by a two-stage notification subscription mechanism, the computer program product comprising:
one or more computer-readable storage media and program instructions stored on the one or more computer-readable storage media, the program instructions comprising:
program instructions to subscribe, by client components, to notifications for topics at a client-side hub;
program instructions to open a connection to a notification server, initiated by the client-side hub;
program instructions to subscribe, by the client-side hub, to the notification server for a united set of topics the client components subscribed to at the client-side hub; and
program instructions to receive a united set of data relating to the united set of topics from the notification server to the client-side hub, wherein the united set of data comprises data the client components subscribed to at the client-side hub such that network traffic is reduced.

17. The computer program product according to claim 16, wherein the united set of data comprises event notifications from sensors.

18. The computer program product according to claim 16, wherein the client components comprise portlets.

19. The computer program product according to claim 16, further comprising:
program instructions to separate the united set of data received from the notification server and
program instructions to dispatch individual values out of the united set of data to subscribed notification requests the client components have subscribed to.

20. The computer program product according to claim 16, wherein the united set of data comprises data related to threshold topics, which are defined as topics the client components subscribed to at the client-side hub that exceeds a threshold value.

* * * * *